United States Patent [19]

Ryoke et al.

[11] Patent Number: 5,512,350
[45] Date of Patent: Apr. 30, 1996

[54] MAGNETIC RECORDING MEDIUM HAVING A MAGNETIC LAYER WITH A SPECIFIED SURFACE ROUGHNESS AND WHICH CONTAINS FERROMAGNETIC POWDER, BINDER, AND AN ABRASIVE

[75] Inventors: Katsumi Ryoke; Katsuhiko Meguro; Hiroaki Doushita; Masaki Suzuki; Toshiyuki Kitahara; Masami Sato, all of Kanagawa, Japan

[73] Assignee: Fuji Photo Film Co., Ltd., Kanagawa, Japan

[21] Appl. No.: 441,009

[22] Filed: May 15, 1995

Related U.S. Application Data

[63] Continuation of Ser. No. 99,430, Jul. 30, 1993, abandoned.

[30] Foreign Application Priority Data

Jul. 31, 1992 [JP] Japan ..................... 4-205734
Jul. 31, 1992 [JP] Japan ..................... 4-205735

[51] Int. Cl.$^6$ ........................................ G11B 5/00
[52] U.S. Cl. .................... 428/141; 428/323; 428/328; 428/329; 428/694 BN; 428/694 BP; 428/694 BR
[58] Field of Search .................... 428/323, 328, 428/329, 141, 694 BN, 694 BP, 694 BR, 900

[56] References Cited

U.S. PATENT DOCUMENTS

| | | | |
|---|---|---|---|
| 4,670,337 | 6/1987 | Tokuoka et al. | 428/323 |
| 4,693,930 | 9/1987 | Kuo et al. | 428/323 |
| 5,009,929 | 4/1991 | Iida et al. | 427/130 |
| 5,036,629 | 8/1991 | Ishikuro et al. | 51/281 R |
| 5,126,215 | 6/1992 | Aonuma et al. | 428/694 |
| 5,158,802 | 10/1992 | Yoshimura et al. | 427/130 |
| 5,169,703 | 12/1992 | Miyazaki et al. | 428/141 |
| 5,212,019 | 5/1993 | Ryoke et al. | 428/694 BB |
| 5,252,392 | 10/1993 | Goto et al. | 428/336 |

FOREIGN PATENT DOCUMENTS 3-162717  7/1991  Japan .

*Primary Examiner*—Stevan A. Resan
*Attorney, Agent, or Firm*—Sughrue, Mion, Zinn, Macpeak & Seas

[57] ABSTRACT

A magnetic recording medium comprises a magnetic layer containing a ferromagnetic powder, a binder and an abrasive material having a Mohs hardness of 8 or more on a non-magnetic support, wherein the average protrusion height, which represents the length between the central line of the surface roughness of the sectional curve of the magnetic layer and the upper end of the abrasive material existing (i) above the central line of the surface roughness of the magnetic layer and (ii) in the surface layer of the magnetic layer, is 15 nm or less. A process for preparing the magnetic recording medium comprises coating on a non-magnetic support a magnetic layer containing a ferromagnetic powder, a binder and an abrasive material having a Mohs hardness of 8 or more, and then polishing the surface of the magnetic layer with an abrasive tape, wherein as the abrasive tape there is used one containing at least one abrasive material having a higher Mohs hardness than the abrasive material to be incorporated in the magnetic layer.

5 Claims, 1 Drawing Sheet

MAGNETIC RECORDING MEDIUM HAVING A MAGNETIC LAYER WITH A SPECIFIED SURFACE ROUGHNESS AND WHICH CONTAINS FERROMAGNETIC POWDER, BINDER, AND AN ABRASIVE

This is a Continuation of application Ser. No. 08/099,430 filed Jul. 30, 1993, now abandoned.

FIELD OF THE INVENTION

The present invention relates to a magnetic recording medium comprising a magnetic layer and a non-magnetic support. More particularly, the present invention relates to a magnetic recording medium having a magnetic layer which provides improved abrasion resistance and toughness to VTR heads, an invariantly high output, reduced stain on VTR heads, and excellent running stability.

BACKGROUND OF THE INVENTION

As magnetic recording media for use in audio, video, computer (disc, memory tape), etc. there has been normally used a magnetic recording medium comprising on a non-magnetic support a magnetic layer having a ferromagnetic powder dispersed in a binder.

Heretofore, such a magnetic recording medium has comprised a magnetic layer containing a ferromagnetic powder, a binder and an abrasive material having a Mohs hardness of 8 or more. Among these components, the abrasive material has served to suppress stain on VTR heads to provide invariably excellent recording of visual and audio signals and other data. To this end, various abrasive materials have been proposed, and some are disclosed in JP-B-49-39402 (the term "JP-B" as used herein means an "examined Japanese patent publication"), JP-A-57-183628 and JP-A-57-179945 (the term "JP-A" as used herein means an "unexamined published Japanese patent application"), and U.S. Pat. No. 3,630,910.

In general, the magnetic layer in the magnetic recording medium thus prepared has powder components (e.g., ferromagnetic powder, non-magnetic grains such as abrasive material) rigidly fixed to the film and thus can be considered fairly smooth. However, the inventors' study has shown that the magnetic layer has minute protrusions and insufficiently fixed powder components present in its surface. This is attributed to the fact that the ferromagnetic powder and non-magnetic grains having a hardness as high as 8 or more as calculated in terms of Mohs hardness such as alumina and chromium oxide grains can hardly be dispersed or tend to agglomerate with time even if dispersed. If such an agglomerative magnetic coating is coated on a non-magnetic support, a magnetic layer having minute protrusions and insufficiently fixed powder components having a high Mohs hardness existing in its surface layer is formed. When incorporated in a video tape, for example, such a magnetic layer causes the magnetic head to wear in a short period of time during running. Such minute protrusions and insufficiently fixed powder components may leave the magnetic layer and adhere to the magnetic head, causing clogging of the magnetic head or occur of dropouts. Further, the minute protrusions and insufficiently fixed powder components which have left the magnetic layer during running may cause ferromagnetic powder to leave the surface of the magnetic layer, gradually reducing the content of ferromagnetic powder in the vicinity of the surface of the magnetic layer. This causes another problem that as running is repeated, the electromagnetic conversion characteristics (output) are lowered.

In recent years, these magnetic recording media have been required to provide high density recording. For this purpose, an increase in output and a reduction in noise by super-smoothening of the surface of the magnetic recording medium, finer division of ferromagnetic powder, fine division of metal, high packing, and reduction in the thickness of magnetic recording medium have been demanded. Further, in order to improve the recording density and image quality, it is necessary to reduce the speed of writing into and reading from the magnetic recording medium in VTR, to modify the recording system (i.e., analog system to digital system), or to reduce the recording width (5 to 20 nm) or the minimum recording wavelength (0.1 to 0.9 μm). In the helical scan VTR, the tendency has been that the head cylinder speed is 5,400 rpm or more and the speed of tape relative to the magnetic head is far more than 20 m/sec. In order to provide a magnetic recording medium with such a high output or excellent adaptability to high speed sliding movement, it is indispensable to secure sufficient running stability for the magnetic recording medium in the VTR running system or head and cylinder systems. To this end, carbon black or various lubricants based on organic compounds are used besides the foregoing abrasive materials.

These magnetic recording media have a great disadvantage of insufficient affinity for VTR heads. If the magnetic recording medium is thinned and super-smoothened for high density recording, it is extremely difficult to reduce its coefficient of friction with a VTR head. When the coefficient of friction rises, the surface of the magnetic layer is scraped, contaminating the head. In order to avoid such trouble, an abrasive material as mentioned above is incorporated in the magnetic layer. However, if such an abrasive material is incorporated in such an amount that a sufficient effect of eliminating stain on the magnetic head can be exerted, the head wears to a remarkably larger extent. In order to cope with this problem, it is proposed that the magnetic head be made of a harder material. Accordingly, the amount of an abrasive material to be incorporated in the magnetic layer must be again increased.

In other words, an effective method for coping with the rise in the coefficient of friction of the magnetic recording medium with the VTR head in the prior art is to incorporate an abrasive material and a lubricant in the magnetic recording medium. The stain on the magnetic head can be effectively eliminated by incorporating an abrasive material in the magnetic layer. If such an abrasive material is incorporated in the magnetic layer in a sufficient amount, the wearing of the VTR by the magnetic recording medium is remarkably increased. In order to cope with this problem, it is proposed that the magnetic head be made of a harder material. Accordingly, the amount of an abrasive material to be incorporated in the magnetic layer must be again increased. Thus, either head wearing or head stain must be sacrificed in the prior art. In order to lower the coefficient of friction of the magnetic recording medium with VTR head against the reduction in output caused by the thinning and supersmoothening of the magnetic recording medium for better affinity for VTR head, i.e., high density recording, a lubricant is incorporated in the magnetic layer besides the foregoing abrasive material. The addition of such a lubricant for the reduction of the coefficient of friction plasticizes the magnetic layer, causing output reduction or head stain. Thus, the reduction in the coefficient of friction and the output drop are very difficult to balance.

It has also been proposed that the content of an abrasive material in the surface of the magnetic layer be defined to improve the durability of the magnetic layer. For example, U.S. Pat. No. 4,670,337 (corresponding to JP-A-61-57036) discloses a magnetic recording medium which comprises abrasive grains having a Mohs hardness of 6 or more in a proportion of 3 to 15% by weight based on the weight of magnetic powder wherein the average number of grains per unit area of the surface of the magnetic layer is defined to be 0.25/$\mu m^2$ or more. Further, JP-A-60-93631 discloses a magnetic recording medium comprising non-magnetic abrasive grains having a Mohs hardness of 7 or more in a proportion of 20 pieces or more per 100 $\mu m^2$ of the surface of the magnetic layer. However, none of these proposals can satisfy all the requirements in initial head abrasion, output difference by VTR and low humidity output.

In the field of magnetic discs, it is known to effect polishing for surface smoothening. For example, a magnetic disc substrate surface smoothening apparatus which continuously supplies an abrasive tape onto the surface of a head slider (as disclosed in JP-B-58-46768) and a magnetic disc substrate surface smoothening method which comprises moving back and forth a polishing head having on a slider surface a rough surface portion made of an abrasive grain layer containing hard grains in contact with a magnetic disc substrate while the magnetic disc substrate is rotated (as disclosed in JP-B-58-46767) are known.

As an approach for preventing the foregoing clogging and the occur of outputs to reduce the output drop after repeated running there has been proposed a process for the preparation of a magnetic recording medium which comprises abrading insufficiently fixed powder components on the surface of the magnetic layer as disclosed in JP-A-62-172532 and JP-A-63-98834. That is, the surface of a magnetic layer which has been calendered is polished with a grinding means having a high hardness such as a diamond wheel, a fixed blade or a rotary blade to remove minute protrusions and insufficiently fixed powder components or attachments and hence inhibit the output drop caused by clogging, dropout and prolonged running.

JP-A-63-183619 discloses a process for the preparation of a magnetic recording medium which comprises coating a magnetic layer, drying the material, calendering the material to cure the material, pushing a blade having an edge made of sapphire or diamond against the surface of the magnetic layer while the latter is running, and then polishing the surface of the magnetic layer with a cylindrical diamond grindstone having a grain diameter of 0.5 to 4 $\mu m$. Further, JP-A-3-162717 discloses a process for the preparation of a magnetic recording medium which comprises coating a magnetic layer, calendering the material, and then polishing the surface of the resulting magnetic layer with an ultra-hard blade. However, none of these proposals can satisfy all the requirements in initial head abrasion, output difference by VTR and low humidity output.

SUMMARY OF THE INVENTION

It is therefore an object of the present invention to provide a magnetic recording medium which provides a high output, a high density recording and an extremely excellent running durability. In particular, it is an object of the present invention to provide a magnetic recording medium extremely excellent in running durability such as head abrasion and head stain.

It is a further object of the present invention to provide a process for the preparation of a magnetic recording medium which exhibits a reduced head abrasion during the initial period of tape running, a reduced output difference by VTR and a high RF output.

These and other objects of the present invention will become more apparent from the following detailed description and examples.

Focusing on the characteristics, shape, etc. of abrasive material occurring in the surface of the magnetic layer, the inventors made an extensive study. As a result, an analysis under AFM (inter-atomic force microscope) showed that the average protrusion height, which represents the length between the central line of the surface roughness of the sectional curve of the magnetic layer and the upper end of the abrasive material existing (i) above central line of the surface roughness of the magnetic layer and (ii) in the surface of the magnetic layer, has a great effect on various characteristics such as initial head abrasion, output difference by VTR and low humidity output. The present invention is based in part on this finding.

The foregoing objects of the present invention can be accomplished with a magnetic recording medium comprising a magnetic layer comprising a ferromagnetic powder, a binder and an abrasive material having a Mohs hardness of 8 or more on a non-magnetic support, wherein the average protrusion height, which represents the length between the central line of the surface roughness of the sectional curve of the magnetic layer and the upper end of the abrasive material existing (i) above the central line of the surface roughness of the magnetic layer and (ii) in the surface of the magnetic layer, is 15 nm or less. Preferably, the abrasive material to be incorporated in the magnetic layer is at least one selected from the group consisting of alumina and chromium oxide.

The foregoing objects of the present invention can be further accomplished by a process for the preparation of a magnetic recording medium which comprises providing on a non-magnetic support a magnetic layer comprising a ferromagnetic powder, a binder, additives and an abrasive material having a Mohs hardness of 8 or more, and then polishing the surface of the magnetic layer with an abrasive tape, wherein as the abrasive tape there is used an abrasive tape comprising at least one abrasive material having a higher Mohs hardness than the abrasive material to be incorporated in the magnetic layer.

DETAILED DESCRIPTION OF THE INVENTION

Figure 1:
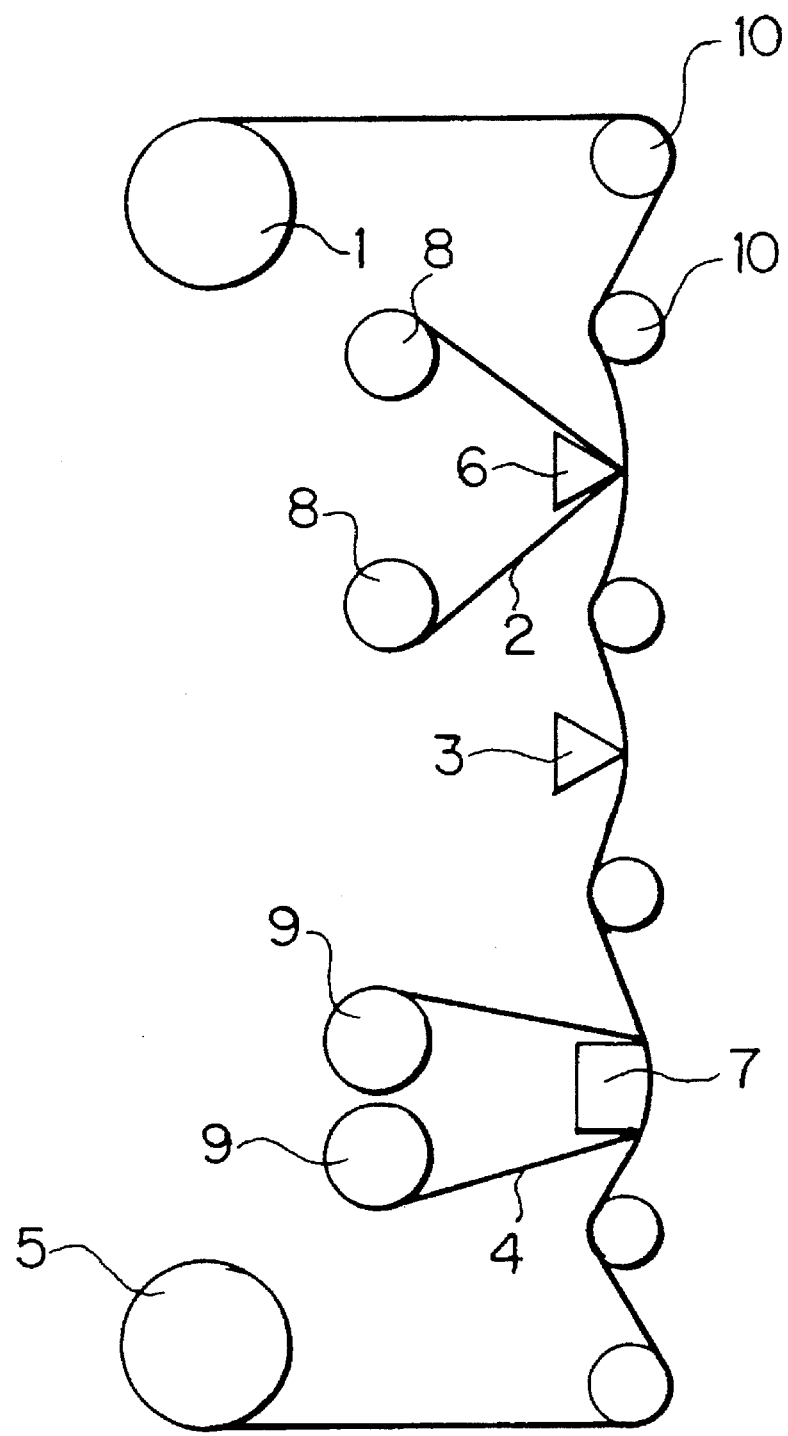
FIG. 1 is a schematic diagram illustrating an example of abrading, grinding and wiping procedures according to the present invention wherein the reference number 1 indicates a delivery roll, the reference number 2 indicates an abrasive tape, the reference number 3 indicates a fixed blade, the reference number 4 indicates a wiping material, the reference number 5 indicates a winding roll, the reference number 6 indicates a pad (for abrasive tape), the reference number 7 indicates a pad (for wiping material), the reference number 8 indicates a rotary roll (for abrasive tape), the reference number 9 indicates a rotary roll (for wiping material), and the reference number 10 indicates a lead-in roll.

The present invention provides a magnetic recording medium comprising a magnetic layer comprising a ferromagnetic powder, a binder and an abrasive material having a Mohs hardness of 8 or more on a non-magnetic support, wherein the average protrusion height, which represents the length between the central line of the surface roughness of the sectional curve of the magnetic layer and the upper end of the abrasive material existing above the central line of the surface roughness of the magnetic layer and in the surface of the magnetic layer, is generally 15 nm or less, preferanly 12 nm or less, and more preferably 10 nm or less, whereby VTR abrasion is reduced to provide an excellent running durability. Preferably, when at least one of the abrasive materials incorporated in the magnetic layer is alumina or chromium oxide and the surface roughness is from 0.1 nm to 6 nm, a magnetic recording medium which exhibits a reduced VTR abrasion and an excellent running durability can be obtained. Further, when the number of abrasive particles existing in the surface of the magnetic layer is from 100 to 1,000 per 100 $\mu m^2$, the amount of the abrasive material to be incorporated in the magnetic layer is from 5 to 20 parts by weight based on 100 parts by weight of ferromagnetic powder, and the ferromagnetic powder to be incorporated in the magnetic layer is a metal powder having a specific surface area of 47 $m^2/g$ or more, a high output and a proper grinding capacity can be obtained. A backing layer having a surface roughness of 2 nm to 15 nm can be provided on the other side of the non-magnetic support opposite the magnetic layer to provide an extremely excellent running durability.

The average protrusion height, which represents between the central line of the surface roughness of the sectional curve of the magnetic layer and the upper end of the abrasive material existing above the central line of the surface roughness of the magnetic layer and in the surface of the magnetic layer as defined herein can be measured by the following method. Specifically, the abrasive material existing in the surface of the magnetic layer is observed under AFM (inter-atomic force microscope) to determine the roughness curve of the surface of the magnetic layer and its central line. The average protrusion height of the upper end of the abrasive material existing above the central line of the surface roughness of the magnetic layer and in the surface of the magnetic layer is then measured. The position of the abrasive material in the surface of the magnetic layer is then microphotographically identified. The average protrusion height to the upper end of the abrasive material existing above the central line of the surface roughness of the magnetic layer and in the surface of the magnetic layer can then be measured under the conditions that the number of the samples is 20. In the case where the magnetic layer is in a multi-layer construction, the average grain size of the abrasive material existing in the uppermost magnetic layer is preferably from 0.1 to 1 µm wherein the thickness of the uppermost layer may be not more than the average grain size of the abrasive material. In the case where the magnetic layer is in a single-layer construction, the average grain size of the abrasive material existing in the magnetic layer is preferably from 0.1 to 1 µm wherein the thickness of the single layer is preferably not less than the average grain size of the abrasive material. In the present invention, the amount of the abrasive material to be incorporated in the magnetic layer is preferably from 5 to 20 parts by weight based on 100 parts by weight of ferromagnetic powder. If the amount of the abrasive material to be incorporated in the magnetic layer falls below 5 parts by weight based on 100 parts by weight of ferromagnetic powder, the average protrusion height of the abrasive material existing above the central line of the surface roughness of the magnetic layer may attain 15 nm or less, but the reduction in the amount of the abrasive material makes it difficult to obtain a sufficient cleaning effect. On the contrary, if the amount of the abrasive material to be incorporated in the magnetic layer exceeds 20 parts by weight based on 100 parts by weight of ferromagnetic powder, the average protrusion height of the abrasive material existing above the central line of the surface roughness of the magnetic layer can exceed 15 nm and a sufficient cleaning effect can be obtained, but the head abrasion shows an abnormal increase, rendering the product unsuitable as a magnetic recording medium.

In the magnetic layer formed according to the conventional techniques, the average protrusion height between the central line of the surface roughness of the sectional curve of the magnetic layer and the upper end of the abrasive material existing above the central line of the surface roughness of the magnetic layer and in the surface of the magnetic layer exceeds 15 nm. Thus, only a magnetic recording medium which exhibits an increased VTR head abrasion and hence a poor running durability can be obtained. Therefore, if the abrasive protrusion height is too great, it gives an increased the VTR head abrasion, reducing the life of the VTR head. In order to reduce VTR head abrasion, it is an effective approach to reduce the content of the abrasive material. However, this approach diminishes the effect of cleaning the VTR head, causing head clogging that results in output drop. The magnetic recording medium eventually loses its commercial value.

The desired protrusion height of the abrasive material can be attained by calendering the magnetic recording medium through metal rolls to smoothen the surface of the magnetic layer as much as possible (6 nm or less), and then controlling the height of the abrasive material through a post-treatment. In some more detail, a magnetic recording medium comprising on a non-magnetic support a magnetic layer comprising a ferromagnetic powder, a binder and an abrasive material having a Mohs hardness of 8 or more can be twice subjected to supercalendering at a conveying speed of 10 m/min. to 900 m/min. and a molding temperature of 50° C. to 130° C. through multi-stage opposing metal rolls, followed by polishing to adjust the average protrusion height to not more than 15 nm. The details of supercalendering and polishing will be described later. Further, at least one of the abrasive materials to be incorporated in the magnetic layer is preferably alumina, chromium oxide or diamond. After being calendered, the magnetic layer exhibits a surface roughness of 0.1 nm to 6 nm, providing a magnetic recording medium excellent in its durability and the durability of the VTR head. By defining the requirements of the magnetic recording medium such that the number of abrasive material particles existing in the surface of the magnetic layer is generally from 100 to 1,000, preferably from 120 to 800, and more preferably from 150 to 500, per 100 $\mu m^2$, the content of abrasive material in the magnetic layer is generally from 5 to 20 parts by weight, preferably from 7 to 18 parts by weight, and more preferably from 8 to 16 parts by weight, based on 100 parts by weight of ferromagnetic powder, and the ferromagnetic powder in the magnetic layer is a metal powder having a specific surface area of 47 $m^2/g$ or more, the magnetic material, magnetic layer and backing layer can be supersmoothened to attain a high output. By controlling the protrusion height of abrasive material and the number of abrasive material particles, a proper grinding capacity can be obtained. Further, by controlling the surface roughness of the backing layer provided on the other side of the non-magnetic support to 2 to 15 nm, preferably 5 to 14 nm, and more preferably from 8 to 13 nm, an extremely excellent running durability and a high C/N (carrier/noise ratio) can be obtained. Although the reason is unknown, when the height of the abrasive material is controlled as defined herein, the resulting magnetic recording medium can easily provide its output invariantly with respect to different heads. It was further found that such an arrangement drastically eliminates dropouts of about −2 dB for 1μ second that cause an output drop.

Further, the inventors found that a magnetic recording medium which exhibits a reduced head abrasion, particularly during the initial period of tape running, an output difference by VTR and a high RF output can be obtained by a process for the preparation of a magnetic recording medium which comprises providing on a non-magnetic support a magnetic layer comprising a ferromagnetic powder, a binder, additives and an abrasive material having a Mohs hardness of 8 or more, and then polishing the surface of the magnetic layer with an abrasive tape, wherein as the abrasive tape there is used an abrasive tape comprising at least one abrasive material having a higher Mohs hardness than the abrasive material to be incorporated in the magnetic layer. Thus, the present invention was worked out.

In some more detail, by polishing the surface of the magnetic layer with an abrasive tape comprising at least one abrasive material having a higher Mohs hardness than the abrasive material to be incorporated in the magnetic layer, the abrasive material protruding from the surface of the magnetic layer can be scraped. Further, an abrasive tape inherently has the effect of removing the binder from the surface of the magnetic layer. That is, the binder can be removed from the surface of the magnetic layer, exerting a remarkable effect of avoiding the output drop. The prior art abrasive tape treatment can remove materials lightly attached to the surface of the magnetic layer but cannot trim abrasive materials embedded in and protruding from the surface of the magnetic layer, making it impossible to reduce the head abrasion, particularly during the initial period of tape running. Further, a grinder such as a diamond wheel can scrape the abrasive material but cannot remove the binder from the surface of the magnetic layer, making it impossible to inhibit the output drop. The present invention provides an overall solution to these problems.

The magnetic recording medium according to the present invention has a basic structure comprising a magnetic layer comprising a ferromagnetic powder, a binder and an abrasive material coated on a non-magnetic support.

In the magnetic layer according to the present invention, the magnetic layer may comprise various solid and liquid lubricants. Further, a backing layer comprising non-magnetic powders (e.g., carbon black, inorganic powder, abrasive material, solid lubricant) and a binder may be provided on the side of the non-magnetic support opposite the magnetic layer.

Moreover, the magnetic recording medium according to the present invention may comprise rust preventives, antistatic agents, non-magnetic powders, dyes, organic magnetic compounds, dispersants, etc. in the magnetic layer besides the lubricants. The magnetic recording medium may comprise a mixed magnetic layer or a plurality of magnetic layers having the same or different kinds of ferromagnetic powders.

As the ferromagnetic powder to be used in the present invention there can be used $\gamma$-$Fe_2O_3$, Co-containing (coating, modified, doping) $\gamma$-$Fe_2O_3$, $Fe_3O_4$, Co-containing (coating, modified, doping) $Fe_3O_4$, $\gamma$-$FeO_x$, Co-containing (coating, modified, doping) $\gamma$-$FeO_x$ (x=1.33 to 1.50), $CrO_2$, etc. In particular, ferromagnetic metallic powder of a single metal or alloy such as α-Fe, Co, Ni, Fe—Co alloy, Fe—Co—Ni alloy, Fe—Co—Ni—P alloy, Fe—Co—Ni—B alloy, Fe—Ni—Zn alloy, Ni—Co alloy and Co—Ni—Fe alloy can preferably be used. With respect to the grain size of these ferromagnetic metallic powders, their length is from 0.005 to 1 μm, and the ratio of axis length/axis width is from 1/2 to 15/1. These ferromagnetic metallic powders preferably exhibit a specific surface area of 47 to 80 $m^2/g$, more preferably 53 to 70 $m^2/g$, a coercive force (Hc) of 1,250 to 2,500 Oe, a water content of 0.1 to 2.0% by weight, and a pH value of 3 to 11 (5 g magnetic material/100 g water). These ferromagnetic powders may be impregnated with a corrosion inhibitor, surface treatment, dispersant, lubricant, antistatic agent or the like in the solvent prior to dispersion so that they adsorb these agents for the respective purpose. The magnetic recording medium of the present invention comprises a magnetic layer having such a ferromagnetic powder dispersed in a binder provided on a nonmagnetic support. Specific examples of such a ferromagnetic alloy powder include powder of an alloy 60% by weight or more of which is a metallic content 70% by weight or more of which is at least one ferromagnetic metal or alloy (e.g., Fe, Fe—Co, Fe—Co—Ni, Co, Ni, Fe—Ni, Co—Ni, Co—Ni—Fe) and 40% by weight or less, preferably 20% by weight or less of which is another component (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P), a powder of iron nitride, or a powder of iron carbide. In particular, the metallic iron preferably comprises Al, Si or Cr in the surface singly or in admixture to improve its strength. Further, the ferromagnetic metal may contain a small amount of water, hydroxide, oxide, alkaline metal element (e.g., Na, K), or alkaline earth metal element (e.g., Mg, Ca, Sr). Methods for the preparation of these ferromagnetic metal powders have been already known. The ferromagnetic alloy powder as a typical example of the ferromagnetic powder to be used in the present invention can be prepared by these known methods.

Examples of the method for the preparation of ferromagnetic alloy powder include the following methods:

(a) Method which comprises the reduction of a composite organic acid salt (mainly oxalate) with a reducing gas such as hydrogen;

(b) Method which comprises the reduction of iron oxide with a reducing gas such as hydrogen to obtain Fe or Fe—Co powders;

(c) Method which comprises the thermal decomposition of a metallic carbonyl compound;

(d) Method which comprises the reduction of an aqueous solution of ferromagnetic metal with a reducing agent such as sodium borohydride, hydrophosphite and hydrazine;

(e) Method which comprises the electrodeposition of a ferromagnetic metal powder on a mercury cathode, and then separation of the ferromagnetic metal powder from the mercury cathode; and (f) Method which comprises the evaporation of a metal in a low pressure inert gas to obtain a finely divided metal powder.

The ferromagnetic metal powder to be used in the present invention is not specifically limited in respect to its shape, but the shape thereof may normally be acicular, granular, dice, ellipsoidal, or plate-like shapes, particularly one having the foregoing acicular ratio. These ferromagnetic alloy powders preferably exhibit σs of 100 to 210 emu/g. The crystallite size of these ferromagnetic metal powders is preferably in the range of 100 to 300 Å. Preferred examples of dice shape include cube, hexahedron, and octahedron. Plate-like ferromagnetic metal powders preferably have a diameter/thickness ratio of 3/1 to 30/1. Examples of these ferromagnetic alloy powders are disclosed in JP-A-53-70397, JP-A-58-119609, JP-A-58-130435, JP-A-59-80901, JP-A-59-16903, JP-A-59-41453, JP-B-61-37761, and U.S. Pat. Nos. 4,447,264, 4,791,021 and 4,931,198.

As the binder to be incorporated in the magnetic layer and backing layer of the present invention there can be used any known thermoplastic resin, thermosetting resin, reactive resin, electron radiation curing resin, ultraviolet curing resin, visible radiation curing resin or mixture thereof. As such a thermoplastic resin there can be used one having a softening temperature of 150° C. or lower, an average molecular weight of 10,000 to 300,000, and a polymerization degree of about 50 to 2,000, preferably 200 to 600. Examples of such a thermoplastic resin include vinyl chloride-vinyl acetate copolymers, vinyl chloride copolymers, vinyl chloride-vinyl acetate-vinyl alcohol copolymers, vinyl chloride-vinyl alcohol copolymers, vinyl chloride-vinylidene chloride copolymers, vinyl chloride-acrylonitrile copolymers, ester acrylate-acrylonitrile copolymers, ester acrylate-vinylidene chloride copolymers, ester acrylate-styrene copolymers, ester methacrylate-acrylonitrile copolymers, ester methacrylate-vinylidene copolymers, ester methacrylate-styrene copolymers, urethane elastomers, nylon-silicone resins, nitrocellulose polyamide resins, polyvinyl fluorides, vinylidene chloride-acrylonitrile copolymers, butadiene-acrylonitrile copolymers, polyamide resins, polyvinyl buryrals, cellulose derivatives (e.g., cellulose acetate butyrate, cellulose diacetate, cellulose triacetate, cellulose propionate, nitrocellulose, ethylcellulose, methylcellulose, propylcellulose, methyl ethyl cellulose, carboxymethyl cellulose, acetyl cellulose), styrene-butadiene copolymers, polyester resins, polycarbonate resins, chlorovinyl ether-ester acrylate copolymers, amino resins, various synthetic rubber thermoplastic resins, and mixtures thereof. Examples of these resins are disclosed in JP-B-37-6877, JP-B-39-12528, JP-B-39-19282, JP-B-40-5349, JP-B-40-20907, JP-B-41-9463, JP-B-41-14059, JP-B-41-16985, JP-B-42-6428, JP-B-42-11621, JP-B-43-4623, JP-B-43-15206, JP-B-44-2889, JP-B-44-17947, JP-B-44-18232, JP-B-45-14020, JP-B-45-14500, JP-B-47-18573, JP-B-47-22063, JP-B-47-22064, JP-B-47-22068, JP-B-47- 22069, JP-B-47-22070, JP-B-47-27886, JP-A-57-133521, JP-A-58-137133, JP-A-58-166533, JP-A-58-222433, JP-A-59- 58642, and U.S. Pat. Nos. 4,571,364 and 4,752,530.

The thermosetting resin or reactive resin exhibits a molecular weight that is 200,000 or less in the form of coating solution but approaches infinity when it is subjected to heating and moistening after coating and drying to undergo reaction such as condensation and addition. Preferred among these resins are those which do not soften or melt until they undergo thermal decomposition. Specific examples of such resins include phenolic resins, phenoxy resins, epoxy resins, polyurethane resins, polyester resins, polyurethane polycarbonate resins, urea resins, melamine resins, alkyd resins, silicone resins, acrylic reactive resins (electron radiation curing resin), epoxy-polyamide resins, nitrocellulose melamine resins, mixtures of high molecular polyester resins and diisocyanate prepolymers, mixtures of polyester polyols and polyisocyanates, urea-formaldehyde resins, mixtures of low molecular glycols, high molecular diols and triphenylmethane triisocyanates, polyamine resins, polyimine resins, and mixtures thereof. Examples of such resins are disclosed in JP-B-39-8103, JP-B-40-9779, JP-B-41-7192, JP-B-41- 8016, JP-B-41-14275, JP-B-42-18179, JP-B-43-12081, JP-B-44-28023, JP-B-45-14501, JP-B-45-24902, JP-B-46-13103, JP-B-47-22065, JP-B-47-22066, JP-B-47-22067, JP-B-47- 22072, JP-B-47-22073, JP-B-47-28045, JP-B-47-28048, and JP-B-47-28922. These thermoplastic, thermosetting and reactive resins normally contain as functional groups other than the main functional group for the resin, one to six functional groups selected from the group consisting of acidic groups such as a carboxylic acid (—COOM in which M represents a hydrogen atom, an alkaline metal, an alkaline earth metal or a hydrocarbon group), sulfinic acid, sulfenic acid, sulfonic acid (—SO$_3$M), phosphoric acid (—PO(OM)(OM)), phosphonic acid, sulfuric acid (—OSO$_3$M) and ester group thereof; amphoteric groups such as amino acid, aminosulfonic acid, sulfuric or phosphoric ester of amino alcohol, and alkylbetaine; an amino group; an imino group; an imide group; an amide group; a hydroxyl group; an alkoxyl group; a thiol group; an alkylthio group; a halogen atom (F, Cl, Br, I); a silyl group; a siloxane group; an epoxy group; an isocyanate group; a cyano group; an nitrile group; an oxo group; an acryl group; and a phosphine group. These functional groups may each be incorporated in an amount of $1\times10^{-6}$ equivalent to $1\times10^{-2}$ equivalent per g of resin.

Particularly preferred among these resins are those containing at least one functional group selected from the group consisting of a sulfonic acid, a phosphoric acid, a phosphonic acid, an epoxy group and a hydroxyl group.

As a polyisocyanate to be incorporated in the magnetic layer or backing layer of the present invention there can be used an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate and isophorone diisocyanate; a product of the reaction of such an isocyanate and a polyalcohol; a dimeric to decameric polyisocyanate produced by the condensation of isocyanates; or an isocyanate-terminated product of the reaction of a polyisocyanate and a polyurethane. Such a polyisocyanate preferably has an average molecular weight of 100 to 20,000. Examples of commercial name of these polyisocyanates include Colonate L, Colonate HL, Colonate 2030, Colonate 2031, Millionate MR, Millionate MTL (Nihon Polyurethane Co., Ltd.), Takenate D-102, Takenate D-110N, Takenate D-200, Takenate D-202, Takenate 300S, Takenate 500 (Takeda Chemical Industries, Ltd.), Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (Sumitomo Byer Co., Ltd.). These polyisocyanates may be singly used. Alternatively, two or more of these polyisocyanates may be used in combination utilizing their difference in curing reactivity. Further, for the purpose of accelerating the curing reaction, a hydroxyl group (e.g., butanediol, hexanediol, polyurethane having a molecular weight of 1,000 to 10,000, water), a compound containing an amino group (e.g., monomethylamine, dimethylamine, trimethylamine), or a catalyst such as metallic oxide catalyst and iron acetylacetonate may be used as well. These hydroxyl groups or amino-containing compounds are preferably polyfunctional. Such a polyisocyanate may be preferably incorporated both in the magnetic layer and backing layer in an amount of 2 to 70 parts by weight, more preferably 5 to 50 parts by weight, based on 100 parts by weight of the total amount of binder resin and polyisocyanate. These examples are disclosed in JP-A-60-131622 and JP-A-61-74138.

These binders may be used singly or in combination. These binders may be used in combination with additives. The mixing proportion of the binder to the ferromagnetic powder in the magnetic layer is from 3 to 100 parts by weight based on 100 parts by weight of ferromagnetic powder. The mixing proportion of the binder to the finely divided powder in the backing layer is from 8 to 150 parts by weight based on 100 parts by weight of finely divided powder. Examples of additives include dispersant, lubricant, abrasive, antistatic agent, oxidation inhibitor, and solvent.

Examples of carbon black to be incorporated in the magnetic layer and backing layer of the present invention include furnace black for rubber, thermal black for rubber, black for color, and acetylene black. The carbon black is used as antistatic agents, light screens, friction coefficient adjustors or durability improvers. Specific examples of abbreviations of the carbon black in the U.S. include SAF, ISAF, IISAF, T, HAF, SPF, FF, FEF, HMF, GPF, APF, SRF, MPF, MPF, ECF, SCF, CF, FT, MT, HCC, HCF, MCF, LFF, and RCF. Thus, carbon blacks classified according to D-1765-82a of ASTM in the U.S. can be used. The carbon black to be used in the present invention exhibit an average grain size of 5 to 1,000 mµ (as determined by electron microscope), a specific surface area of 1 to 800 $m^2/g$ as determined by the nitrogen adsorption process, a pH value of 4 to 11 (as determined by JIS-K-6221-1982) and a dibutyl phthalate (DBP) oil absorption of 10 to 800 ml/100 g (as determined by JIS-K-6221-1982). The size of carbon black to be used in the present invention may range from 5 mµ to 100 mµ for the purpose of lowering the surface electric resistance of the coating film or may range from 50 mµ to 1,000 mµ for the purpose of controlling the strength of the coating film. Further, finer carbon black (less than 100 mµ) may be used to smoothen the surface of the coating film for the purpose of controlling the surface roughness of the coating film. Moreover, rough carbon black (100 mµ or more) may be used to roughen the surface of the coating film to lower the friction coefficient thereof. Thus, the kind and content of carbon black are properly used depending on the purpose required for the magnetic recording media in question. These carbon blacks may be subjected to surface treatment with a dispersant as mentioned later or graft polymerization with a resin. Carbon black whose surface has been partially graphitized by treating the material at a furnace temperature of 2,000° C. or higher may be used. As special carbon black there may be used hollow carbon black. When incorporated in the magnetic layer, the carbon black is preferably used in an amount of 0.1 to 20 parts by weight based on 100 parts by weight of ferromagnetic powder. When incorporated in the backing layer, the carbon black is preferably used in an amount of 20 to 400 parts by weight based on 100 parts by weight of binder. For carbon blacks which can be incorporated in the backing layer, reference can be made to *Carbon Black Binran* (*Handbook of Carbon Black*), (Carbon Black Kyokai, 1973). Examples of these carbon blacks are disclosed in U.S. Pat. Nos. 4,539,257 and 4,614,685, JP-A-61-92424, and JP-A-61-99927.

The abrasive material to be incorporated in the magnetic layer or backing layer is for the purpose of improving the durability of the magnetic tape. In general, such an abrasive material is a material having an abrading action or a cratching action. As such an abrasive material there may be preferably used at least one of α-alumina, γ-alumina, α,γ-alumina, molten alumina, chromium oxide and diamond. As other abrasive materials there may be preferably used in combination one to four kinds of abrasive materials having a Mohs hardness of 6 or more selected from the group consisting of silicon carbide, cerium oxide, corundum, α-iron oxide, garnet, emery (main component: corundum, magnetite), silica, silicon nitride, boron nitride, molybdenum carbide, boron carbide, tungsten carbide, titanium carbide, tripoli, diatomaceous earth and dolomite. These abrasive materials exhibit an average grain size of 0.005 to 5 µm, particularly preferably 0.01 to 2 µm. These abrasive materials may be preferably used in an amount of 0.1 to 20 parts by weight based on 100 parts by weight of ferromagnetic powder in the magnetic layer. Further, these abrasive materials may be preferably used in an amount of 0.01 to 5 parts by weight based on 100 parts by weight of non-magnetic powder in the backing layer. Specific examples of these abrasive materials include AKP1, AKP15, AKP30, AKP50, AKP80, Hit 50, and Hit 100 available from Sumitomo Chemical Co., Ltd. For the details of these abrasive materials, reference can be made to JP-B-52- 28642, JP-B-49-39402, JP-A-63-98828, U.S. Pat. Nos. 3,687,725, 3,007, 807, 3,041,196, 3,293,066, 3,630,910, 3,833,412, and 4,117, 190, British Patent 1145349, and West German Patent 853211.

Examples of powdered lubricants to be incorporated in the magnetic layer or backing layer of the present invention include powders of inorganic materials such as graphite, molybdenum disulfite, boron nitride, graphite fluoride, calcium carbonate, barium sulfate, silicon oxide, titanium oxide, zinc oxide, tin oxide and tungsten disulfite, and resin powders such as acrylstyrene resin powder, benzoguanamine resin powder, melamine resin powder, polyolefin resin powder, polyester resin powder, polyamide resin powder, polyimide resin powder and polyethylene fluoride resin powder.

As organic lubricants there may be used fluorine- or silicon-containing compounds such as silicone oil (e.g., dialkyl polysiloxane, dialkoxy polysiloxane, phenyl polysiloxane, fluoroalkyl polysiloxane (KF96, KF69 available from Shin-Etsu Chemical Co., Ltd.)), aliphatic acid modified silicone oil, fluorine alcohol, alkane (liquid paraffin), polyolefin (e.g., polyethylene wax, polypropylene), polyglycol (e.g., ethylene glycol, polyethylene oxide wax), tetrafluoroethylene oxide wax, polytetrafluoroglycol, perfluoroalkyl ether, perfluoroaliphatic acid, perfluoroaliphatic ester, perfluoroalkylsulfuric ester, perfluoroalkylsulfonic ester, perfluoroalkylbenzenesulfonic ester and perfluoroalkylphosphoric ester (e.g., clitox); organic acids and organic ester compounds such as alkylsulfuric ester, alkylsulfonic ester, alkylphosphonic triester, alkylphosphonic monoester, alkylphosphonic diester, alkylphosphoric ester and succinic ester; nitrogen- or sulfur-containing heterocyclic compounds such as triazaindolizine, tetrazaindene, benzotriazole, benzotriazine, benzodiazole and EDTA; aliphatic esters made of monobasic aliphatic acid having from 10 to 40 carbon atoms and any one or more of monovalent, divalent, trivalent, tetravalent, pentavalent and hexavalent alcohols having from 2 to 40 carbon atoms, aliphatic esters made of monobasic aliphatic acid having 10 or more carbon atoms and monovalent to hexavalent alcohol having carbon atoms, totalling 11 to 70 carbon atoms with that of the aliphatic acid; aliphatic acids, aliphatic amides, aliphatic alkylamides, and aliphatic alcohols having from 8 to 40 carbon atoms. These carbon atoms may be branched at any positions. Preferred branching positions are the iso-position, the 2-position and the 3-position. Preferred examples of such organic lubricants include octyl caprilate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, amide stearate, alkylamide stearate, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. These organic lubricants may be used singly or in combination. In the present invention, these lubricants may be used with so-called lubricant additives, singly or in combination. Examples of such lubricant additives include oxidation inhibitors known as rust preventives (e.g., alkyl phenol, benzotriazine, tetrazaindene, sulfamide, guanidine, nucleic acid, pyridine, amine, hydroquinone, metal chelating agent such as EDTA), rust preventives (e.g., naphthenic acid, alkenylsuccinic acid, phosphoric acid, dilauryl phosphate), oil agents (e.g., colza oil, lauryl alcohol), extreme-pressure additives (e.g., dibenzyl sulfide, tricresyl phosphate, tributyl phosphite), detergent-dispersants, viscosity index improvers, pour point depressants, and anti-foaming agents. These lubricants may be used in a composite form. Alternatively, a compound comprising two or more of these characteristic groups incorporated in one molecule may be used. Examples of such a compound include fluorinated aliphatic acids, fluorinated aliphatic esters, siloxane-introduced aliphatic acids, and siloxane-introduced aliphatic esters. Such a lubricant may be used in an amount of 0.01 to 30 parts by weight based on 100 parts by weight of binder in the magnetic layer or backing layer. For the details of such a lubricant, reference can be made to JP-B-43- 23889, JP-B-48-24041, JP-B-48-18482, JP-B-44-18221, JP-B-47-28043, JP-B-57-56132, JP-A-59-8136, JP-A-59-8139, JP-A-61-85621, U.S. Pat. Nos. 3,423,233, 3,470,021, 3,492,235, 3,497,411, 3,523,086, 3,625,760, 3,630,772, 3,634,253, 3,642,539, 3,687,725, 4,135,031, 4,497,864, and 4,552,794, *IBM Technical Disclosure Bulletin*, vol. 9, No. 7, page 779 (December, 1966), *ELECTRONIK*, No. 12, page 380 (1961), and *Kagaku Binran (Handbook of Chemistry)*, Application Edition, pp. 954–967, (Maruzen, 1980).

Examples of dispersants or dispersion aids to be used in the present invention include aliphatic acids having from 2 to 40 carbon atoms ($R_1COOH$ in which $R_1$ is an alkyl, phenyl or aralkyl group having from 1 to 39 carbon atoms) such as caprilic acid, captic acid, lauric acid, myristic acid, palmitic acid, stearic acid, oleic acid, elaidic acid, linoleic acid, stearolic acid, behenic acid, maleic acid and phthalic acid; salts of these aliphatic acids with alkaline metals (e.g., Li, Na, K, $NH_4^+$) or alkaline earth metals (e.g., Mg, Ca, Ba); metallic soap made of Cu, Pb, etc. (copper oleate); aliphatic amides; and lecithin (soybean oil lecithin), etc. Besides these compounds, higher alcohols having from 4 to 40 carbon atoms (e.g., butanol, octyl alcohol, myristyl alcohol, stearyl alcohol, cetyl alcohol, isocetyl alcohol), sulfuric esters thereof; sulfonic acids; phenylsulfonic acids; alkylsulfonic acids; sulfonic esters; phosphoric monoesters; phosphoric diesters; phosphoric triesters; alkylphosphonic acids; phenylphosphonic acids; and amine compounds can be used. Further, polyethylene glycols, polyethylene oxides, sulfosuccinic acids, sulfosuccinic metal salts, and sulfosuccinic esters can be used. One of more kinds of these lubricants are normally used. These dispersants may be each used in an amount of 0.005 to 20 parts by weight based on 100 parts by weight of binder. These dispersants may be previously coated on the surface of ferromagnetic powder or nonmagnetic powder or may be added to the system during dispersion. These examples are disclosed in JP-B-39-28369, JP-B-44-17945, JP-B-44- 18221, JP-B-48-7441, JP-B-48-15001, JP-B-48-15002, JP-B-48-16363, JP-B-49-39402, and U.S. Pat. Nos. 3,387,993 and 3,470,021.

Examples of mildewproofing agents to be used in the present invention include 2-(4-thiazolyl)benzimidazole, N-(fluorodichloromethylthio)phthalimide, 10,10'-oxybisphenoxarcine, 2,4,5,6-tetrachloroisophthalonitrile, P-tolyldiodemethylsulfone, triiodeallyl alcohol, dihydroaceto acid, mercury phenyloleate, bis(tributyltin) oxide, and salicylanilide. These examples are disclosed in *Biseibutsu Saigai to Boshi Gijutstu (Microbic Disaster and Preventive Technique)*, (Kogaku Tosho, 1972), and *Kaqaku to Koqyo (Chemistry and Industry)*, 32, 904 (1979). These mildewproofing agents may be each used in an amount of 0.005 to 20 parts by weight based on 100 parts by weight of binder.

Examples of antistatic agents other than carbon black to be used in the present invention include electrically conductive powders such as graphite, modified graphite, carbon black graft polymer, tin oxide-antimony oxide, tin oxide and titanium oxide-tin oxide-antimony oxide; natural surface active agents such as saponin; nonionic surface active agents such as ones of the alkylene oxide type, glycerin type, or glycidol type, polyhydric alcohols, esters of polyhydric alcohols, and adducts of alkylphenolethylene oxide; cationic surface active agents such as higher alkylamine, cyclic amine, hydantoin derivative, amideamine, esteramide, quaternary ammonium salt, pyridine, other heterocycles, phosphonium and sulfonium; anionic surface active agents containing acidic groups such as carboxylic acid, sulfonic acid, phosphonic acid, phosphoric acid, sulfuric ester, phosphonic ester and phosphoric ester; and amphoteric surface active agents such as amino acids, aminosulfonic acids, sulfuric or phosphoric esters of aminoalcohol and alkylbetaine-type surfactants. Some examples of surface active agent compounds which can be used as antistatic agents are disclosed in JP-A-60-28025, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West German Patent Publication (OLS) No. 1942665, British Patents 1,077,317, and 1,198,450, Ryohei Oda, *Kaimen Kasseizai no Gosei to sono oyo (Synthesis and application of surface active agent)*, (Maki Shoten, 1972), A. W. Baily, *Surface Active Agents (Interscience Publication Corporated*, 1985), T. P. Sisley, *Encyclopedia of Surface Active Agents*, vol. 2 (Chemical Publish Company, 1964), *Kaimen Kasseizai Binran (Handbook of Surface Active Agents)*, 6th ed. (Sangyo Tosho K.K., 1966), and Hideo Marushige, *Taidenboshizai (Antistatic Agents)* (Saiwai Shobo, 1968). These surface active agents may be incorporated in the system singly or in combination. Such a surface active agent may be used in an amount of 0.01 to 10 parts by weight based on 100 parts by weight of ferromagnetic powder in the magnetic recording medium. Such a surface active agent may also be used in an amount of 0.01 to 30 parts by weight based on 100 parts by weight of binder in the backing layer. Such a surface active agent is used as an antistatic agent but may occasionally be used for other purposes such as accelerating dispersion and curing, improving magnetic characteristics and smoothness and facilitating coating and wetting.

Examples of organic solvents to be used in the dispersion, kneading and coating according to the present invention include any proportion ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, ethyl acetate, butyl acetate, isobutyl acetate, isopropyl acetate, ethyl lactate, and glycol acetate monoethyl ether; ethers such as diethyl ether, tetrahydrofuran, glycol dimethyl ether, glycol monoethyl ether and dioxane; tar (aromatic hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformaldehyde; and hexane. In general, two or more kinds of these solvents may be used in any proportion. These solvents may contain impurities (e.g., polymers of these solvents, water content, starting materials) in an amount as slight as 1% by weight or less. These solvents may each be used in an amount of 100 to 200,000 parts by weight based on 100 parts by weight of the total solid content in the magnetic solution, backing layer solution or undercoating solution. The optimum solid content of the magnetic solution is from 5 to 40% by weight. The optimum solid content of the backing layer solution is from 5 to 30% by weight. An aqueous solvent (e.g., water, alcohol, acetone) may be used instead of the organic solvent.

The formation of the magnetic recording layer or backing layer may be accomplished by subjecting the foregoing components in any combination to dipping, dissolution, mixing, dispersion, kneading and dilution in any order in organic solvents, singly or in combination, to obtain a coating solution, coating the coating solution on a support, drying the material, and then orienting the material. When the magnetic recording medium is used as a tape or disc, the thickness of the support is from 2.5 to 500 μm, preferably 3 to 100 μm. The support is preferably made of a plastic such as polyethylene naphthalate, polyethylene terephthalate, polyimide and polyamide. For the details of such a support, reference can be made to West German Patent 3338854A, JP-A-59-116926, JP-A-61-129731, U.S. Pat. No. 4,388,368, and Yukio Mitsuishi, *Seni to Kogyo* (*Fiber and Industry*), vol. 31, pp. 50–55, 1975. When the magnetic recording medium is used as a video tape, the support preferably exhibits an average surface roughness of 0.1 to 30 nm (cut off value: 0.25 mm) at the central line. The Young's modulus (F-5 value, i.e., the load at the 5% elongation) of such a support may be from 2 kg/mm$^2$ to 100 kg/mm$^2$ in both the width and length directions depending on the purpose.

The dispersion and kneading methods are not specifically limited. The order of addition of the various components (e.g., resin, powder, lubricant, solvent), the position at which these components are added during dispersion or kneading, the proportion of divisional addition of the same starting materials, the dispersion temperature (0° to 80° C.), the dispersion humidity, etc. can be properly determined. The preparation of the magnetic coating and backing layer coating can be accomplished by means of a commonly used kneader such as two-roll mill, three-roll mill, ball mill, pebble mill, tron mill, sand grinder, Szegvari, attritor, high speed impeller, dispersing machine, high speed stone mill, high speed impact mill, disper, kneader, high speed mixer, ribbon blender, cokneader, intensive mixer, tumbler, blender, disperser, homogenizer, single screw extruder, double screw extruder and ultrasonic wave dispersing machine. In general, the dispersion and kneading can be continuously carried out by means of a plurality of these dispersing machine and kneaders. The dispersion and kneading techniques are further described in T. C. Patton, *Paint Flow and Pigment Dispersion* (John Wiley & Sons, 1964), Shinichi Tanaka, *Kogyo Zairyo* (*Industrial Materials*), vol. 25, No. 37 (1977), and references cited therein. As auxiliary materials for maximizing the efficiency of dispersion and kneading there can be used steel balls, steel beads, ceramic beads, glass beads and organic polymer beads having a diameter of 0.05 mm to 10 cm as calculated in terms of sphere. These materials are not limited to spheres. These materials are also described in U.S. Pat. Nos. 2,581,414 and 2,855,156. In the present invention, the dispersion and kneading can be carried out by methods as described in the above mentioned references and references cited therein to prepare a magnetic coating or backing layer coating. The hardener and some of the above mentioned additives (e.g., aliphatic acid, phosphoric acid, phosphonic acid and sulfonic acid having a high reactivity with magnetic material, and esters thereof) may be added to the coating solution by means of an adding apparatus such as a mixing valve shortly before coating.

The coating of the above mentioned magnetic layer coating solution, backing layer coating solution and undercoating solution on the support can be accomplished by adjusting the viscosity of the coating solution to 1 to 20,000 cSt. (at 25° C.), and then coating the coating solution on the support by means of an air doctor coater, blade coater, air knife coater, squeeze coater, impregnation coater, reverse roll coater, transfer roll coater, gravure coater, kiss coater, cast coater, spray coater, rod coater, forward roll coater, curtain coater, extrusion coater, bar coater or the like. Other methods can be used. These methods are further described in *Coating Engineering*, (Asakura Shoten, pp. 253–277, 1971). The order of coating of these coating solutions can be arbitrarily selected. The coating of undercoating layers can be continuously carried out before the coating of desired solutions. If the magnetic layer or backing layer is to consist of a plurality of layers, these layers may be simultaneously or successively coated. These methods are further described in JP-A-57-123532, JP-A-59-142741, JP-A-59- 165239, and JP-B-62-37451.

The magnetic coating having a thickness of about 1 to 100 μm (0.1 to 50 g/m$^2$ as calculated in terms of solid content) which has thus been provided on the support is then oriented under a gravity of 500 to 5,000 G in the desired direction (e.g., vertical, lengthwise, widewise, random, diagonal) with the magnetic powder therein being optionally dried immediately at a temperature of 20° to 130° C. in many stages. The resulting magnetic layer is then dried to a thickness of 0.1 to 10 μm. During this process, the support is normally carried at a rate of 10 m/min. to 900 m/min. through a plurality of drying zones whose temperature is controlled to 20° to 130° C. so that the remaining amount of solvent in the coated film reaches 0.01 to 40 mg/m$^2$. In the present invention, the magnetic recording medium is then subjected to supercalendering, followed by surface smoothening to adjust the central line average surface roughness of the magnetic layer and backing layer to the desired value. The material is then cut into the desired shape to prepare the magnetic recording medium of the present invention. The supercalendering treatment is preferably effected by means of opposing metal rolls. During this supercalendering treatment, the magnetic recording medium is normally carried at a rate of 10 m/min. to 900 m/min. The supercalendering is normally effected two or more times. The molding temperature is preferably in the range of 50° C. to 130° C. For this treatment, a combination of metal roll and ultrahard plastic or a combination of ultrahard plastics may be used.

These preparation methods may selectively comprise powder pretreatment and surface treatment, kneading and dispersion, coating, orientation, and drying, smoothening, heat treatment, EB treatment, surface grinding, cutting, winding, etc. These steps are preferably carried out in succession. These methods are disclosed in JP-B-40-23625, JP-B-39-28368, JP-B-47-38802, JP-B-48-11336, JP-B-52-17404, British Patent 1,191,424, JP-A-49-53631, JP-A-50-112005, JP-A-51-77303, JP-A-60-70532, JP-A-2-265672, and U.S. Pat. Nos. 3,473,960, and 4,746,542. The method as described in JP-B-41-13181 is considered a functional and important technique in the art.

The magnetic recording medium which has thus been cut is then wound on the desired plastic or metallic reel. The cutting can be effected by means of an ordinary cutter under normal conditions. Shortly before winding or during the previous step, the magnetic recording medium may be preferably subjected to polish and/or cleaning on the magnetic layer, backing layer, edge surface, base surface or the like. Polish specifically serves to scrape off protrusions on the surface of the magnetic recording medium by means of a hard material such as sapphire blade, shaving blade, ultrahard blade, diamond blade and ceramic blade so that it is smoothened. The Mohs hardness of these blade materials is preferably 8 or more but is not specifically limited and may be enough to remove the protrusions from the surface of the magnetic recording medium. These materials are not necessarily in the form of a blade but may be in the form of a square or a wheel (these materials may optionally be coated on the periphery of a rotary cylinder).

In the case of a rotary blade, treatment is preferably effected at a winding angle of 180° or more and a blade rotary speed of 900 rpm or more. If an abrasive tape is used to treat the magnetic recording medium, it is necessary that the contact surface reach 0.1 mm or more. During this treatment, the tension on the magnetic recording medium needs to be 200 g or more per ½ inch. The change in the tension on the magnetic recording medium from that before and after this treatment needs to be 200 g or more per ½ inch.

Polishing is roughly divided into two treatments, i.e., abrasion treatment and grinding treatment. In the abrasion treatment, the surface of the magnetic layer is abraded with an abrasive tape or the like to diminish powdered components such as ferromagnetic powder separatable from the surface of the magnetic layer. In the grinding treatment, a grinder having a high hardness such as a fixed blade, a diamond wheel or a rotary blade is used to grind the surface of the magnetic layer to remove separatable powdered components or attachments on the surface of the magnetic layer so that the amount of materials to be separated from the surface of the magnetic layer is minimized.

In the polishing treatment with an abrasive tape, the laminated body is carried at a rate of 60 to 1,200 m/min. in contact with the abrasive tape with a tension of 50 to 200 g per ½ inch applied in the length direction to polish the surface of the magnetic layer. During this process, the abrasive tape is carried at a rate of 1 to 3 cm/min. in the direction opposite that of the laminated body. In this arrangement, a pad is pushed against the other side of the abrasive tape toward the laminated body to push the abrasive surface of the abrasive tape against the laminated body. With the abrasive tape and the magnetic layer positioned at a contact angle of 30 to 120 degrees, the polishing treatment can be effected most advantageously.

FIG. 1 is a schematic diagram illustrating an example of the polishing and wiping processes used in the present invention.

As shown in FIG. 1, a laminated body is delivered from a delivery roll 1, abraded with an abrasive tape 2, polished with a fixed blade 3, wiped with a wiping material 4, and then wound on a winding roll 5 to complete the treatment. Shown at 10 is a lead-in roll which serves to smoothen the delivery of the laminated body. The abrasive tape 3 is conveyed at a rate of 1 to 3 cm/min. in the direction opposite that of the laminated body by a pair of revolving rolls 8. A pad 6 is pushed against the abrasive tape 3 in contact with the surface of the magnetic layer to effect polishing.

In FIG. 1, there may be two or more abrasion zones with such an abrasive tape. In the case where abrasion is effected not only on the surface of the magnetic layer but also on the surface of the backing layer, such an abrasion zone may be provided on the side of the laminated body opposite the abrasion zone for the magnetic layer.

A fixed blade 3 for polishing may not be used or may be replaced by a diamond wheel or rotary blade. The fixed blade 3 may be optionally used in combination with a diamond wheel or rotary blade.

Further, in the case where polishing is effected not only on the surface of the magnetic layer but also on the surface of the backing layer, a fixed blade and/or diamond wheel or rotary blade may be provided on the side of the laminated body opposite the polishing zone for the magnetic layer.

The wiping material 4 is conveyed at a rate of 0.5 to 10 cm/min. in the direction opposite that of the laminated body by a pair of rotary rolls 9. A pad 7 is pushed against the wiping material 4 toward the laminated body in contact with the surface of the magnetic layer to effect wiping.

There may be two or more wiping zones with such a wiping material. In the case where wiping is effected not only on the surface of the magnetic layer but also on the surface of the backing layer, a similar wiping zone with a wiping material may be provided on the side of the laminated body opposite the wiping zone for the magnetic layer.

An example of such a polishing treatment is disclosed in JP-A-63-259830.

The abrasive tape to be used in the present invention comprises at least one abrasive material having a Mohs hardness of 5 to 10 such as $\alpha$-$Al_2O_3$, $SiO_2$, $Cr_2O_3$, $\alpha$-$Fe_2O_3$, diamond, $ZnO_2$ and $TiO_2$. In the present invention, the abrasive tape needs to comprise at least one abrasive material having a higher Mohs hardness than the abrasive material contained in the magnetic layer. Otherwise, the polishing effect on the magnetic layer is insufficient.

The average grain diameter of the abrasive material to be incorporated in the present invention is normally from 0.05 to 10 μm, preferably from 0.1 to 5 μm. If the average grain diameter of the abrasive material falls below 0.05 μm, an effective abrasion may not be effected. On the contrary, if the average grain diameter of the abrasive material exceeds 10 μm, the surface of the magnetic layer may be damaged.

Further, the proportion of the abrasive material having a higher hardness than the abrasive material contained in the magnetic layer in the total weight of abrasive materials contained in the abrasive tape is generally from 0.5 to 100% by weight, preferably from 1.0 to 100% by weight. If this proportion falls below 0.5% by weight, an effective abrasion may not be effected.

The support material of the abrasive tape to be used in the present invention may be selected from the group consisting of polyesters such as polyethylene terephthalate (PET); polyolefins such as polypropylene; films or sheets made of synthetic resins such as cellulose derivative, vinyl resin, polycarbonate and polyamide; foils of a non-magnetic metal such as aluminum and copper; paper; and ceramic sheets.

The surface roughness (central line average roughness) Ra of the abrasive tape to be used in the present invention is preferably in the range of 0.07 to 0.9 μm. The conditions under which the surface roughness (central line average roughness) Ra of the abrasive tape is measured are described below.

A central line average roughness measuring machine (Surfcom 400B, 403B, 404B system produced by Tokyo Seimitsu Co., Ltd.) may be used. The measurement is conducted under the conditions of cutoff value of 0.8 mm, conveying speed of 0.3 mm, stylus pressure of 0.07 g, stylus diameter of 2 µm, and range of 20 K/0.5.

The abrasive tape to be used in the present invention may be prepared in accordance with, e.g., the following method. Specifically, the foregoing abrasive material is dispersed in a binder, coated on a support, dried, and then cut into a desired size. As the binder there may be used a thermoplastic resin, a thermosetting resin and a reactive resin, singly or in admixture. The mixing proportion of the binder and the abrasive material is from 10 to 200 parts by weight of binder based on 100 parts by weight of abrasive material.

For the details of polishing treatment, reference can be made to JP-A-62-172532 and JP-A-63- 988345. Specific examples of grinders to be used include fixed blade, diamond wheel, and rotary blade.

The fixed blade as used herein is a blade whose portion to come in contact with the surface of the magnetic layer or backing layer to be polished is made of a substance having a high hardness. The Mohs hardness of such a blade is preferably 8 or more, more preferably 9 or more, but should not be construed as being specifically limited so long as it can remove protrusions. The fixed blade is normally made of a material such as sapphire, alumina, cermet, zirconia (zirconia oxide), silicon nitride, silicon carbide, diamond and hard metal and thus is adapted to scrape protrusions from the surface of the magnetic recording medium to smoothen the surface of the magnetic recording medium. In general, with the fixed blade and the magnetic layer kept at a contact angle of 30 to 120 degrees and a tension of 50 to 160 g per ½ inch applied in the lengthwise direction, the fixed blade is brought into contact with the laminated body while the latter is conveyed at a rate of 60 to 1,200 m/min. to polish the surface of the magnetic layer.

A diamond wheel as used herein is a cylindrical rotary grinder having diamond sintered on its periphery. The diamond wheel to be used in the present invention normally exhibits a viscosity of No. 1,200 to No. 5,000. If the grain size falls below No. 1,200, the surface of the magnetic layer may be damaged. On the contrary, if the grain size exceeds No. 5,000, an effective polishing may not be effected. In general, with the circumferential speed of the diamond wheel kept to 50 to 1,500 m/min., the diamond wheel and the magnetic layer kept at a contact angle of 30 to 270 degrees, and a tension of 50 to 160 g per ½ inch applied in the length direction, the diamond wheel is brought into contact with the laminated body while the latter is conveyed at a rate of 60 to 1,200 m/min. to polish the surface of the magnetic layer. In general, the diamond wheel is preferably rotated in the direction opposite to the running direction of the laminated body. In this arrangement, polishing can be effected most advantageously.

Further, a rotary blade as used herein is a grinder comprising a rotator and at least one blade provided along the rotating axis of the rotator and on the periphery of the rotator. In general, with the rotary speed of the rotary blade kept to 300 to 6,000 rpm, the rotary blade and the magnetic layer kept at a contact angle of 30 to 270 degrees, and a tension of 50 to 160 g per ½ inch applied in the length direction, the rotary blade is brought into contact with the laminated body while the latter is conveyed at a rate of 60 to 1,200 m/min. to polish the surface of the magnetic layer. In general, the rotary blade is preferably rotated in the direction opposite the running direction of the laminated body. In this arrangement, polishing can be effected most advantageously.

The magnetic layer is brought into contact with the fixed blade, diamond wheel or rotary blade at least once. In particular, a method which comprises providing two to five fixed blades, diamond wheels or rotary blades so that the magnetic layer is continuously brought into contact with these grinders can be used to prepare a magnetic recording medium which exhibits an extremely improved running durability.

Alternatively, a fixed blade, a diamond wheel or a rotary blade may be properly used in combination to provide continuous contact between the magnetic layer and the grinders.

In accordance with the foregoing polishing treatment with an abrasive tape and polishing treatment with a grinder such as fixed blade, diamond wheel and rotary blade, powder components such as ferromagnetic powder and abrasive material powder protruding from the surface of the magnetic layer, unreacted hardener existing on the surface of the magnetic layer and attachments on the surface of the magnetic layer (e.g., dust attached to the surface of the magnetic layer during the preparation of the magnetic recording medium), etc. can be scraped together with the binder existing in the vicinity of the surface of the magnetic layer (normally a height of 0.01 to 5 µm) to smoothen the surface of the magnetic layer. If the backing layer, too, is polished, powder components such as non-magnetic powder are less likely to leave the material. Accordingly, even if the magnetic recording medium which has been cut into strips and wound is used, powder components are less likely to leave the surface of the backing layer and then adhere to the surface of the magnetic layer to cause the generation of dropouts or clogging.

A cleaning of the magnetic recording medium is effected for the purpose of removing contaminants and extra lubricants from the surface thereof. It is accomplished by wiping the surface of the magnetic recording medium on the magnetic layer, backing layer, edge and base with a nonwoven fabric or the like. Examples of wiping materials include various Vilenes available from Japan Vilene Co., Ltd., Toraysee and Ecsaine available from Toray Industries, Inc., and Kuraray WRP Series available from Kuraray Co., Ltd. Examples of nonwoven fabric include nonwoven nylon fabric, nonwoven polyester fabric, nonwoven rayon fabric, nonwoven acrylonitrile fabric, and nonwoven mixed fabric. In addition, tissue paper, Kimwipe®, etc. may be used. Examples of these wiping materials are disclosed in JP-B-46-39309, JP-B-58-46768, JP-B-58- 46767, JP-A-56-90429, JP-A-63-259830, and JP-A-1-201824. This wiping treatment fully removes attachments and organic substances from the magnetic layer and/or backing layer, reducing the occurrence of dropouts or clogging.

By employing the foregoing treatments in combination, the effect of polishing with an abrasive tape can be further enhanced. In particular, the surface of the magnetic recording medium which has been polished with an abrasive tape and then with a grinder such as a blade is preferably subjected to wiping with a wiping material. However, the order of these polishing and wiping treatments should not be limited to that mentioned above.

The foregoing description has been mainly made with reference to the surface of the magnetic layer and/or backing layer of a laminated body which has been cured and cut. However, the present invention should not be limited to this order. For example, the magnetic recording medium may be polished while or before being cut. Since the curing reaction gradually proceeds without any curing treatment, the surface of the magnetic layer and/or backing layer can be polished with an abrasive tape without being cured after calendering.

These preparation methods may comprise powder pretreatment and surface treatment, kneading and dispersion, coating, orientation, drying, calendering, curing (heat treatment, EB treatment), polishing, cutting, winding, etc. These steps are preferably carried out in succession. These methods are disclosed in JP-B-40-23625, JP-B-39-28368, JP-B-47-38802, JP-B-48- 11336, JP-B-52-17404, British Patent 1191424, JP-A-49- 53631, JP-A-50-112005, JP-A-51-77303, JP-A-60-70532, JP-A- 2-265672, and U.S. Pat. Nos. 3,473,960, 4,728,569, and 4,746,542. The method as described in JP-B-41-13181 is considered a functional and important technique in the art.

For the ferromagnetic powder, non-magnetic powder, binder, additives (e.g., lubricant, anti-static agent, surface treatment, carbon black, abrasive material, light screen, oxidation inhibitor, mildew-proofing agent), solvent and support (which may comprise an undercoating layer, backing layer or back undercoating layer) or the process for the preparation of magnetic recording medium, reference can be made also to JP-B-56-26890.

The foregoing description has been mainly made with reference to the surface of the magnetic layer and/or backing layer of a laminated body which has been calendered and cut. However, the present invention should not be limited to this order. For example, the magnetic recording medium may be polished while or before being cut.

Since the curing reaction gradually proceeds without any curing treatment, the surface of the magnetic layer and/or backing layer can be polished with an abrasive tape without being cured after calendering.

The present invention will be further described in the following examples. It will be readily appreciated by those skilled in the art that the components, proportions and order of procedures can be altered without departing from the scope of the present invention. Thus, the present invention should not be construed as being limited to the following examples. The "parts" as used herein indicate "parts by weight".

EXAMPLES 1-1 TO 1-7 & COMPARATIVE EXAMPLES 1-1 TO 1-3

A magnetic coating having the formulations described below was prepared by kneading the following composition (1) by means of an open kneader, adding the following composition (2) to the material, dispersing the material by means of a sand mill, and then adding the following composition (3) to the material before coating. The magnetic coating thus obtained was then coated on a 7.0-μm thick nonmagnetic polyethylene naphthalate support having an undercoating layer provided thereon (Young's modulus in MD direction: 900 kg/mm$^2$; Young's modulus in TD direction: 700 kg/mm$^2$) in such an amount that the dry thickness of the magnetic layer reached 2.0 μm.

| Formulations of magnetic coating | |
|---|---|
| Composition (1) | |
| Ferromagnetic alloy powder (metallic iron powder; silicon content: 5% by weight; specific surface area [S$_{BET}$]: 60 m$^2$/g) | 100 parts |
| Ester phosphate (phenylphosphonic acid) | 2 parts |
| Ferric oleate | 0.1 part |
| Vinyl chloride copolymer resin (MR110 produced by Nippon Zeon Co., Ltd.) | 9 parts |
| Urethane resin (UR8600 produced by Toyobo Co., Ltd.) | 3 parts |
| 2-Ethylhexyl palmitate | 0.5 part |
| Cyclohexanone | 30 parts |
| Methyl ethyl ketone | 20 parts |
| Composition (2) | |
| Dispersion (2-1) | |
| Carbon black (Conductex SC) | 0.4 part |
| Urethane resin (UR8600 produced by Toyobo Co., Ltd.) | 1 part |
| Methyl ethyl ketone | 10 parts |
| Dispersion (2-2) | |
| Abrasive (HIT55 produced by Sumitomo Chemical Co., Ltd.) | 10 parts |
| Vinyl chloride resin (MR110 available from The Japan Zeon Co., Ltd.) | 1 part |
| Methyl ethyl ketone | 40 parts |
| Cyclohexanone | 60 parts |
| Composition (3) | |
| Polyisocyanate (Colonate 3040 available from Nihon Polyurethane K.K.) | 3 parts |
| Methyl ethyl ketone | 50 parts |
| Toluene | 30 parts |
| Dibutylamide stearate | 0.5 part |
| Myristic acid | 0.3 part |
| Butoxyethyl stearate | 0.5 part |

The nonmagnetic support comprising the magnetic coating coated thereon was then subjected to orientation in a magnetic field while the magnetic coating was undried. The material was then dried. A backing layer coating solution was then prepared by adding the following composition (5) to the following composition (4) shortly before coating. The backing layer coating solution was then coated on the material to a dry thickness of 0.6 μm. After further drying, the material was then subjected to metallic supercalendering at a temperature of 100° C., a linear pressure of 350 kg/cm and a rate of 200 m/min. five times. The material was then slit into strips. The magnetic layer on the tape was then treated with a lapping tape having 2% diamond (1 μm) and 98% alumina (0.5 μm) coated thereon at a contact distance of 100 mm and a tension of 400 g per ½ inch to prepare a video tape with Hc of 1,700 Oe, SQ of 0.91, Ra of 3 nm, glossiness of 260 (45 degree reflection) and backing layer Ra of 7 nm. The results are set forth in Table 1.

| Formulations of backing layer coating solution | |
|---|---|
| Composition (4) | |
| Carbon black (Cabot BR800) | 90 parts |
| Carbon black (Cancarb MTCI) | 10 parts |
| α-Alumina (HIT100 produced by Sumitomo Chemical Co., Ltd.) | 0.2 part |
| Barium sulfate (BF1 produced by Sakai Chemical Industry Co., Ltd.) | 0.2 part |
| 2-Ethylhexyl stearate | 0.5 part |
| Copper oleate | 0.1 part |
| Vinyl chloride copolymer resin (MR110 produced by Nippon Zeon Co., Ltd.) | 40 parts |
| Urethane resin (UR8600 produced | 30 parts |

-continued

| Formulations of backing layer coating solution | |
|---|---|
| by Toyobo Co., Ltd.) | |
| Cyclohexanone | 200 parts |
| Methyl ethyl ketone | 300 parts |
| Composition (5) | |
| Polyisocyanate (Colonate 3040 produced by Nippon Polyurethane Co., Ltd.) | 20 parts |
| Methyl ethyl ketone | 3,500 parts |
| Toluene | 200 parts |
| Silicone (KF69 produced by Shin-Etsu Chemical Co., Ltd.) | 0.1 part |

Young's modulus in TD direction: 700 kg/mm$^2$) in such an amount that the dry thickness of the magnetic layer reached 2.0 μm.

| Formulations of magnetic coating | |
|---|---|
| Composition (6) | |
| Ferromagnetic alloy powder (metallic iron powder; aluminum content: 5% by weight; specific surface area [$S_{BET}$]: 55 m$^2$/g) | 100 parts |
| Ester phosphate (phenylphosphonic acid) | 2 parts |
| Oleic acid | 0.1 part |
| Vinyl chloride copolymer resin | 8 parts |

TABLE 1

| | Lapping treatment (tension) | Ra (nm) | Abrasive height (nm) | Number of abrasive pieces (per 100 μm$^2$) | Initial head abrasion (μm/100h) | Output difference by VTR (dB) | Output drop at low humidity (dB) |
|---|---|---|---|---|---|---|---|
| Example | | | | | | | |
| 1-1 | 400 g | 3 | 2 | 200 | 10 | 0 | −2 |
| 1-2 | 350 g | 3 | 4 | 200 | 15 | 2 | −2 |
| 1-3 | 300 g | 3 | 6 | 200 | 23 | 3 | −1 |
| 1-4 | 250 g | 3 | 8 | 200 | 30 | 4 | −1 |
| 1-5 | 200 g | 3 | 12 | 200 | 35 | 6 | −1 |
| 1-6 | 300 g | 3 | 8 | 400 | 30 | 3 | −1 |
| 1-7 | 300 g | 3 | 7 | 250 | 25 | 4 | −2 |
| Comparative Example | | | | | | | |
| 1-1 | 50 g | 3 | 14 | 200 | 80 | 12 | −4 |
| 1-2 | None | 3 | 20 | 200 | 100 | 14 | −2 |
| 1-3 | None | 3 | 16 | 80 | 80 | 12 | −6< |

(Note 1) Example 1-6 was conducted in the same manner as in Example 1 except that the abrasive material (Hit 55) was used in an amount of 15 g.
(Note 2) Example 1-7 was conducted in the same manner as in Example 1 except that as the abrasive material used was chromium oxide having a grain size of 0.5 μm.
(Note 3) Comparative Example 1-3 was conducted in the same manner as in Example 1-1 except that the abrasive material (HIT 55) was used in an amount of 4.5 g.
(Note 4) For the evaluation of initial head abrasion, a brand new M2 VTR was used. In this arrangement, two rolls of 90-minute video tapes were subjected to running. The evaluation was made as calculated in terms of 100 hours.
(Note 5) For the evaluation of output difference by VTR, three sets of M2 VTR's having different head mounting angles were prepared. One of the M2 VTR's was used to effect recording and reproduction. Another M2 VTR was used to reproduce the output from the same video tape. The maximum change in the output between these M2 VTR's was determined for evaluation.
(Note 6) For the output drop at low humidity, the video tape was subjected to running for 90 minutes at a temperature of 23° C. and a relative humidity of 10%. Then, the output drop at low humidity was observed.

The examples show that the control of the height of the abrasive material gives excellent results in initial head abrasion, output difference by VTR and output drop at low humidity. In this case, the content of the abrasive material in the magnetic layer needs to be 5 parts by weight based on 100 parts by weight of ferromagnetic powder and the height of the abrasive material needs to be not more than 15 nm to exert good effects.

EXAMPLE 2-1

A magnetic coating was prepared by thoroughly kneading the following magnetic layer composition (6) by means of a kneader, adding the following composition (7) to the material, thoroughly kneading the material, adding the following composition (8) and then the following composition (9) to the material, and then dispersing the material.

The viscosity of the magnetic coating thus obtained was then adjusted. The magnetic coating was then coated on a 10 μm thick polyethylene terephthalate as a non-magnetic support (Young's modulus in MD direction: 900 kg/mm$^2$;

| -continued | |
|---|---|
| Formulations of magnetic coating | |
| (MR110 produced by The Japanese Zeon Co., Ltd.) | |
| Polyurethane resin (UR8600 produced by Toyobo Co., Ltd.) | 2 parts |
| 2-Ethylhexyl palmitate | 0.6 part |
| Cyclohexanone | 60 parts |
| Methyl ethyl ketone | 80 parts |
| Composition (7) | |
| Dispersion (7-1) | |
| Carbon black (Conductex SC available from Cabot) | 1 part |
| Polyurethane resin (UR8600 produced by Toyobo Co., Ltd.) | 1 part |
| Methyl ethyl ketone | 10 parts |
| Dispersion (7-2) | |
| Abrasive (HIT55 [α-Al$_2$O$_3$] produced by Sumitomo Chemical Co., Ltd.) | 13 parts |

-continued

| Formulations of magnetic coating | |
|---|---|
| Vinyl chloride resin (MR110 available from Niooin Zeon Co., Ltd.) | 1 part |
| Methyl ethyl ketone | 40 parts |
| Cyclohexanone | 60 parts |
| Composition (8) | |
| Polyisocyanate (Colonate 3040 available from Nihon Polyurethane K.K.) | 2 parts |
| Dibutylamide stearate | 0.5 part |
| Palmitic acid | 0.5 part |
| Butoxyethyl stearate | 0.5 part |
| Methyl ethyl ketone | 50 parts |
| Toluene | 30 parts |

The nonmagnetic support comprising the magnetic coating coated thereon was then subjected to orientation in a magnetic field while the magnetic coating was undried. The material was then dried. A backing layer coating solution was then prepared by adding the following composition (10) to the following composition (9) shortly before coating. The backing layer coating solution was then coated on the side of the support opposite the magnetic coating to a dry thickness of 0.6 μm.

| Formulations of backing layer coating solution | |
|---|---|
| Composition (9) | |
| Carbon black (Cabot BP800) | 97 parts |
| Carbon black (Cancarb MTCI) | 3 parts |
| α-$Al_2O_3$ (HIT55 produced by Sumitomo Chemical Co., Ltd.) | 0.1 part |
| Barium sulfate (HIT55 produced by Sumitomo Chemical Co., Ltd.) | 0.1 part |
| 2-Ethylhexyl stearate | 0.5 part |
| Copper oleate | 0.1 part |
| Vinyl chloride copolymer resin (MR110 produced by Nippon Zeon Co., Ltd.) | 5 parts |
| Polyurethane resin (UR8300 produced by Toyobo Co., Ltd.) | 40 parts |
| Cyclohexanone | 200 parts |
| Methyl ethyl ketone | 300 parts |
| Composition (10) | |
| Polyisocyanate (Colonate 3040 produced by Nippon Polyurethane Co., Ltd.) | 20 parts |
| Methyl ethyl ketone | 3,500 parts |
| Toluene | 200 parts |
| Silicone compound (KF69 produced by The Shin-Etsu Chemical Co., Ltd.) | 0.1 part |

After drying, the material was then calendered at a temperature of 90° C., a linear pressure of 350 kg/cm and a rate of 200 m/min. five times to prepare a laminated body comprising a magnetic layer and a backing layer coated on a non-magnetic support.

The laminated body was then subjected to heat treatment at a temperature of 60° C. for 24 hours to cure the polyisocyanate compound contained therein. The laminated body was then slit into strips having a width of ½ inch. The magnetic layer on the laminated body was then polished with an abrasive tape comprising abrasive materials (diamond/$Cr_2O_3$/red iron oxide) having an average grain diameter of 0.1 μm containing diamond (Mohs hardness: 10) in an amount of 2.0% by weight based on the total weight of abrasive materials. The material was then wiped with a wiping material (WRP736 available from Kuraray Co., Ltd.) to prepare a video tape having a width of ½ inch.

Tape abrasion conditions

The surface of the magnetic layer was polished with the abrasive tape and the magnetic layer positioned at a contact angle of 80 degrees or less in contact with each other at a tension of 800 g per ½ inch while the laminated body was running at a rate of 60 to 1,200 m/min. During this procedure, the abrasive tape was conveyed by rotary rolls at a rate of 1.5 cm/min. in the direction opposite the delivery of the laminated body. A pad was pushed against the other side of the abrasive tape toward the laminated body.

EXAMPLE 2-2

A ½ inch video tape was prepared in the same manner as in Example 2-1 except that polishing was conducted with an abrasive tape comprising abrasive materials (diamond/$Cr_2O_3$/red iron oxide) having an average grain diameter of 0.5 μm containing diamond (Mohs hardness: 10) in an amount of 2.0% by weight based on the total weight of abrasive materials.

EXAMPLE 2-3

A ½ inch video tape was prepared in the same manner as in Example 2-1 except that polishing was conducted with an abrasive tape comprising abrasive materials (MA20000 [abrasive material: diamond/$Cr_2O_3$/red iron oxide] available from Fuji Photo Film Co., Ltd.) having an average grain diameter of 1.0 μm containing diamond (Mohs hardness: 10) in an amount of 2.0% by weight based on the total weight of abrasive materials.

EXAMPLE 2-4

A ½ inch video tape was prepared in the same manner as in Example 2-1 except that polishing was conducted with an abrasive tape comprising abrasive materials (diamond/$Cr_2O_3$/red iron oxide) having an average grain diameter of 2.0 μm containing diamond (Mohs hardness: 10) in an amount of 2.0% by weight based on the total weight of abrasive materials.

EXAMPLE 2-5

A ½ inch video tape was prepared in the same manner as in Example 2-1 except that polishing was conducted with an abrasive tape comprising abrasive materials (diamond/$Cr_2O_3$/red iron oxide) having an average grain diameter of 5.0 μm containing diamond (Mohs hardness: 10) in an amount of 2.0% by weight based on the total weight of abrasive materials.

EXAMPLE 2-6

A ½ inch video tape was prepared in the same manner as in Example 2-1 except that polishing was conducted with an abrasive tape comprising abrasive materials (diamond/$Cr_2O_3$/red iron oxide) having an average grain diameter of 5.0 μm containing diamond (Mohs hardness: 10) in an amount of 0.5% by weight based on the total weight of abrasive materials.

EXAMPLE 2-7

A ½ inch video tape was prepared in the same manner as in Example 2-1 except that polishing was conducted with an abrasive tape comprising abrasive materials (diamond/$Cr_2O_3$/red iron oxide) having an average grain diameter of 1.0 μm containing diamond (Mohs hardness: 10) in an amount of 1.0% by weight based on the total weight of abrasive materials.

EXAMPLE 2-8

A ½ inch video tape was prepared in the same manner as in Example 2-1 except that polishing was conducted with an abrasive tape comprising abrasive materials (diamond/ $Cr_2O_3$/red iron oxide) having an average grain diameter of 1.0 μm containing diamond (Mohs hardness: 10) in an amount of 4.0% by weight based on the total weight of abrasive materials.

EXAMPLE 2-9

A ½ inch video tape was prepared in the same manner as in Example 2-1 except that polishing was conducted with an abrasive tape comprising abrasive materials (diamond/ $Cr_2O_3$/red iron oxide) having an average grain diameter of 1.0 μm containing diamond (Mohs hardness: 10) in an amount of 10.0% by weight based on the total weight of abrasive materials.

EXAMPLE 2-10

A ½ inch video tape was prepared in the same manner as in Example 2-1 except that polishing was conducted with an abrasive tape comprising abrasive materials (diamond/ $Cr_2O_3$/red iron oxide) having an average grain diameter of 1.0 μm containing diamond (Mohs hardness: 10) in an amount of 50.0% by weight based on the total weight of abrasive materials.

EXAMPLE 2-11

A ½ inch video tape was prepared in the same manner as in Example 2-1 except that polishing was conducted with an abrasive tape comprising abrasive materials (diamond/ $Cr_2O_3$/red iron oxide) having an average grain diameter of 1.0 μm containing diamond (Mohs hardness: 10) in an amount of 100.0% by weight based on the total weight of abrasive materials.

EXAMPLE 2-12

A ½ inch video tape was prepared in the same manner as in Example 2-1 except that polishing was conducted with an abrasive tape comprising abrasive materials (MA20000 [diamond/$Cr_2O_3$/red iron oxide] available from Fuji Photo Film Co., Ltd.) having an average grain diameter of 1.0 μm containing diamond (Mohs hardness: 10) in an amount of 2.0% by weight based on the total weight of abrasive materials, followed by polishing of the surface of the magnetic layer with a sapphire blade in accordance with the following method:
Sapphire blade treatment The magnetic layer was polished with a sapphire blade (5 mm wide, 35 mm long, available from Kyocera) having a 60-degree angled sapphire tip positioned in contact with the magnetic layer at a contact angle of 80 degrees and a tension of 80 g per ½ inch. The magnetic layer was once brought into contact with four sheets of sapphire blades in combination.

EXAMPLE 2-13

A ½ inch video tape was prepared in the same manner as in Example 2-1 except that polishing was conducted with an abrasive tape comprising abrasive materials (MA20000 [diamond/$Cr_2O_3$/red iron oxide] available from Fuji Photo Film Co., Ltd.) having an average grain diameter of 1.0 μm containing diamond (Mohs hardness: 10) in an amount of 2.0% by weight based on the total weight of abrasive materials, followed by polishing of the surface of the magnetic layer with a diamond wheel in accordance with the following method:
Diamond wheel treatment The surface of the magnetic layer was polished with a diamond wheel having diamond sintered on the periphery of an iron core to a thickness of 2 mm (diameter: 70 mm, viscosity: No. 3,000, available from Oriental Dia K.K.). The diamond wheel was rotated at 2,000 rpm in the direction opposite the running direction of the magnetic layer. The video tape was once brought into contact with the diamond wheel at a contact angle of 180 degrees and a tension of 80 g per ½ inch.

EXAMPLE 2-14

A ½ inch video tape was prepared in the same manner as in Example 2-1 except that polishing was conducted with an abrasive tape comprising abrasive materials (MA20000 [diamond/$Cr_2O_3$/red iron oxide] available from Fuji Photo Film Co., Ltd.) having an average grain diameter of 1.0 μm containing diamond (Mohs hardness: 10) in an amount of 2.0% by weight based on the total weight of abrasive materials, followed by polishing of the surface of the magnetic layer with a rotary blade in accordance with the following method:
Rotary blade treatment The surface of the magnetic layer was polished with a rotary blade unit having a sapphire blade in the form of a trigonal prism having a length of 35 mm and a 5-mm side regular triangle section provided at an angle θ of 65 degrees on the periphery of a metal cylinder (length: 35 mm; diamond: 20 mm; inner diameter of cavity: 12 mm). The rotary blade was rotated at 1,000 rpm in the direction opposite the running direction of the magnetic layer. The video tape was brought into contact with the rotary blade at a contact angle of 120 degrees and a tension of 80 g per ½ inch.

EXAMPLE 2-15

A ½ inch video tape was prepared in the same manner as in Example 2-1 except that polishing was conducted with an abrasive tape comprising abrasive materials (MA20000 [diamond/$Cr_2O_3$/red iron oxide] available from Fuji Photo Film Co., Ltd.) having an average grain diameter of 1.0 μm containing diamond (Mohs hardness: 10) in an amount of 2.0% by weight based on the total weight of abrasive materials, followed by polishing of the surface of the magnetic layer with a diamond wheel and a sapphire blade in accordance with the foregoing method.

EXAMPLE 2-16

A ½ inch video tape was prepared in the same manner as in Example 8 except that polishing was conducted with an abrasive tape comprising abrasive materials (diamond/ $Cr_2O_3$) having an average grain diameter of 1.0 μm containing diamond (Mohs hardness: 10) in an amount of 2.0% by weight based on the total weight of abrasive materials, followed by polishing of the surface of the magnetic layer with a diamond wheel and a sapphire blade in accordance with the foregoing method.

COMPARATIVE EXAMPLES 2-11 TO 2-15

Video tapes were prepared in the same manner as in Examples 2-11 to 2-15 except that polishing was conducted with an abrasive tape comprising $Cr_2O_3$ (Mohs hardness: 8)

and $Al_2O_3$ (Mohs hardness: 9) as abrasive materials (MS20000 [$Cr_2O_3$/red iron oxide] available from Fuji Photo Film Co., Ltd.), respectively.

Evaluation method

Initial head abrasion

Two rolls of fresh 90-minute video tapes were subjected to running through M2VTR (available from Matsushita Electric Industrial Co., Ltd.) under humidity conditions (25° C., 70% RH). The abrasion on the VTR head was measured and converted to a 100-hour basis.

Output difference by VTR

M2VTR's having different head mounting angles available from Matsushita Electric Industrial Co., Ltd. were prepared. Under humidity conditions (25° C., 70% RH), the video tape was subjected to recording and reproduction with one of these VTR's. The same video tape was then subjected to reproduction with another VTR. Thus, the output change from one VTR to another was determined.

Output drop

The video tapes obtained were subjected to recording with M2VTR available from Matsushita Electric Co., Ltd. under low humidity conditions (25° C., 10% RH) and then running for 90 minutes. Then, the drop in the reproduced RF output was determined.

TABLE 2

| Example No. | Abrasive constitution of abrasive tape | Diamond average grain diameter (μm) | Added amount of diamond (wt %) | Initial head abrasion (μm/100h) | Output difference (dB) | Output drop (dB) |
|---|---|---|---|---|---|---|
| Example | | | | | | |
| 2-1 | diamond/$Cr_2O_3$/red iron oxide | 0.1 | 2.0 | 7 | 2 | 0 |
| 2-2 | diamond/$Cr_2O_3$/red iron oxide | 0.5 | 2.0 | 6 | 1 | 1 |
| 2-3 | diamond/$Cr_2O_3$/red iron oxide | 1.0 | 2.0 | 5 | 1 | 1 |
| 2-4 | diamond/$Cr_2O_3$/red iron oxide | 2.0 | 2.0 | 4 | 1 | 1 |
| 2-5 | diamond/$Cr_2O_3$/red iron oxide | 5.0 | 2.0 | 4 | 1 | 1 |
| 2-6 | diamond/$Cr_2O_3$/red iron oxide | 1.0 | 0.5 | 9 | 2 | 0 |
| 2-7 | diamond/$Cr_2O_3$/red iron oxide | 1.0 | 1.0 | 7 | 1 | 0 |
| 2-8 | diamond/$Cr_2O_3$/red iron oxide | 1.0 | 2.0 | 5 | 1 | 1 |
| 2-9 | diamond/$Cr_2O_3$/red iron oxide | 1.0 | 5.0 | 4 | 1 | 1 |
| 2-10 | diamond/$Cr_2O_3$/red iron oxide | 1.0 | 1.0 | 4 | 1 | 1 |
| 2-11 | diamond/$Cr_2O_3$/red iron oxide | 1.0 | 1.0 | 3 | 1 | 1 |
| 2-12 | diamond/$Cr_2O_3$/red iron oxide | 1.0 | 1.0 | 4 | 0 | 1 |
| 2-13 | diamond/$Cr_2O_3$/red iron oxide | 1.0 | 1.0 | 4 | 0 | 1 |
| 2-14 | diamond/$Cr_2O_3$/red iron oxide | 1.0 | 1.0 | 4 | 0 | 1 |
| 2-15 | diamond/$Cr_2O_3$/red iron oxide | 1.0 | 1.0 | 5 | 1 | 1 |
| 2-16 | diamond/$Cr_2O_3$/red iron oxide | 1.0 | 2.0 | 5 | 1 | 1 |
| Comparative Example | | | | | | |
| 2-11 | $Cr_2O_3$/red iron oxide | — | 0 | 30< | 6 | −6< |
| 2-12 | $Cr_2O_3$/red iron oxide | — | 0 | 30< | 5 | −6< |
| 2-13 | $Cr_2O_3$/red iron oxide | — | 0 | 30< | 7 | −6< |
| 2-14 | $Cr_2O_3$/red iron oxide | — | 0 | 30< | 8 | −6< |
| 2-15 | $Cr_2O_3$/red iron oxide | — | 0 | 30< | 5 | −6< |

Table 2 shows that the magnetic recording medium according to the present invention exhibits a reduced head abrasion, particularly during the initial period of tape running, a reduced output difference by VTR, and an excellent RF output. In particular, if polishing is conducted with an abrasive tape comprising an abrasive material having a higher hardness than that contained in the magnetic layer, the head abrasion can be effectively reduced, prolonging the life of the head. Further, the magnetic recording medium according to the present invention exhibits an excellent compatibility between VTR's and causes little or no output drop. Thus, the present invention exerts remarkable effects as compared with the prior art inventions.

The present invention provides a magnetic recording medium comprising on a non-magnetic support a ferromagnetic powder, a binder and an abrasive material having a Mohs hardness of 8 or more, wherein the average protrusion height of the upper end of the abrasive material existing above the central line of the surface roughness of the magnetic layer and in the surface layer of the magnetic layer is 15 nm or less, whereby VTR head abrasion is reduced to give an excellent running durability. In particular, when the abrasive material to be incorporated in the magnetic layer is at least one selected from the group consisting of alumina, chromium oxide and diamond and the surface roughness of the magnetic layer is in the range of 0.1 nm to 6 nm, a magnetic recording medium excellent in its durability and VTR head abrasion can be obtained. Further, when the number of abrasive particles existing in the surface of the magnetic layer is from 100 to 1,000 per 100 $\mu m^2$, the amount of the abrasive material to be incorporated in the magnetic layer is in the range of 5 to 20 parts by weight based on 100 parts by weight of ferromagnetic powder, and the ferromagnetic powder to be incorporated in the magnetic layer is a metal powder having a specific surface area of 47 $m^2/g$ or more, a high output and a sufficient grinding capacity can be obtained. A backing layer having a surface roughness of 2 nm to 15 nm can be provided on the other side of the non-magnetic support opposite the magnetic layer to provide an extremely excellent running durability.

The present invention provides a process for the preparation of a magnetic recording medium which comprises providing on a non-magnetic support a magnetic layer containing a ferromagnetic powder, a binder, additives and an abrasive material having a Mohs hardness of 8 or more, and then polishing the surface of the magnetic layer with an abrasive tape, wherein as the abrasive tape there is used an abrasive type containing at least one abrasive material having a higher Mohs hardness than the abrasive material to be incorporated in the magnetic layer, whereby a magnetic recording medium which exhibits a reduced head abrasion, particularly during the initial period of tape running, a reduced output difference by VTR and a high RF output can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer containing a ferromagnetic powder, a binder and an abrasive material having a Mohs hardness of 8 or more on a non-magnetic support, wherein the average protrusion height, which represents the length between the central line of the surface roughness of the sectional curve of the magnetic layer and the upper end of the abrasive material existing (i) above the central line of the surface roughness of the magnetic layer and (ii) in the surface of the magnetic layer, is 12 nm or less, and wherein the surface of the magnetic layer has been polished with an abrasive tape which comprises an abrasive material having a higher Mohs hardness than the abrasive material incorporated in the magnetic material.

2. The magnetic recording medium as in claim 1, wherein the abrasive material to be incorporated in the magnetic layer is selected from the group consisting of alumina and chromium oxide.

3. The magnetic recording medium as in claim 1, wherein the surface roughness of the magnetic layer is from 0.1 nm to 6 nm and a backing layer having a surface roughness of 2 nm to 15 nm is provided on the other side of the non-magnetic support.

4. The magnetic recording medium as in claim 1, wherein the number of abrasive material particles present in the surface of the magnetic layer is from 100 to 1,000 per 100 $\mu m^2$ and the abrasive material to be incorporated in the magnetic layer is in the amount of 5 to 20 parts by weight based on 100 parts by weight of the ferromagnetic powder.

5. The magnetic recording medium as in claim 1, wherein the ferromagnetic powder is a metal powder having a specific surface area of 47 $m^2/g$ or more.

* * * * *